Feb. 10, 1925.
W. LA HODNY
BRACKET FOR MOUNTING MIRRORS ON WINDSHIELDS
Filed Aug. 11, 1923
1,526,226
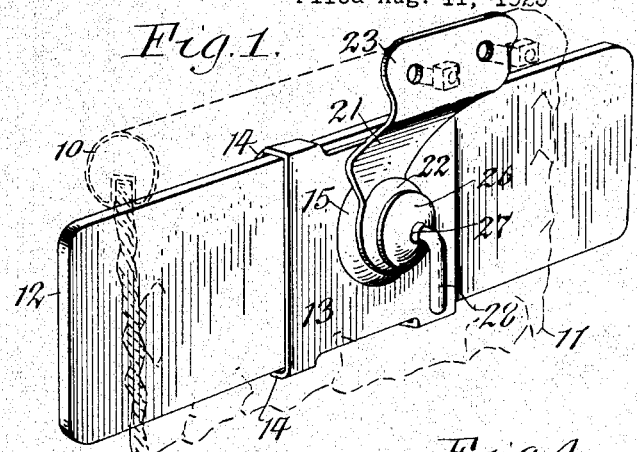
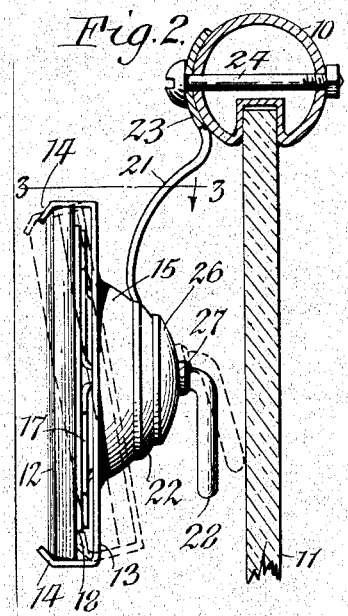
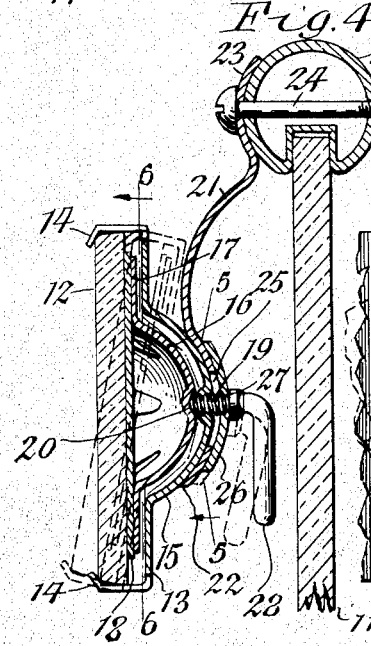
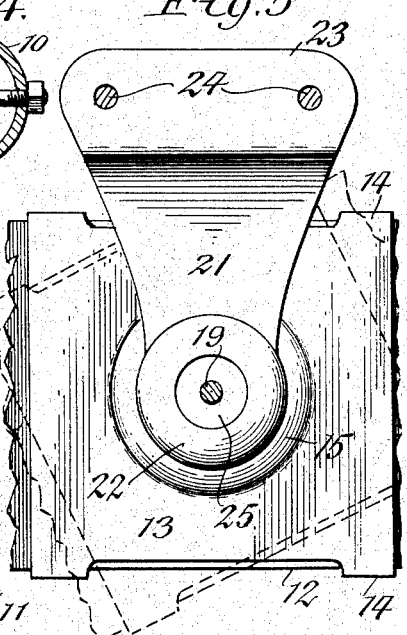
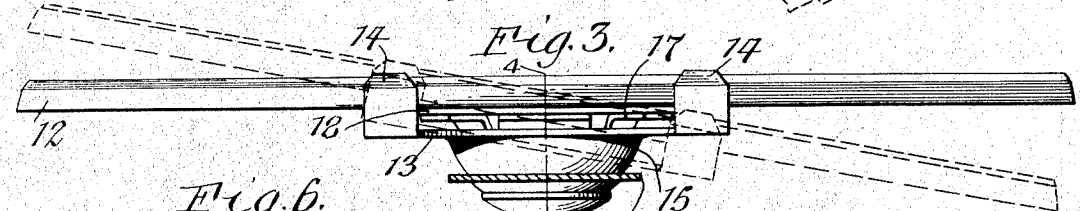
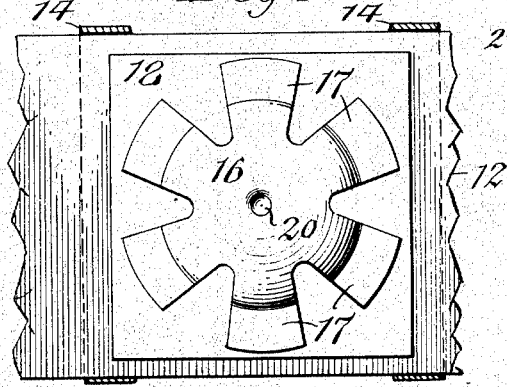
Inventor
William La Hodny
by Poff & Powers
Attorneys Patented Feb. 10, 1925.

1,526,226

UNITED STATES PATENT OFFICE.

WILLIAM LA HODNY, OF BUFFALO, NEW YORK.

BRACKET FOR MOUNTING MIRRORS ON WINDSHIELDS.

Application filed August 11, 1923. Serial No. 656,962.

*To all whom it may concern:*

Be it known that I, WILLIAM LA HODNY, a citizen of the United States, residing at Buffalo, in the county of Erie and State of New York, have invented a new and useful Improvement in Brackets for Mounting Mirrors on Windshields, of which the following is a specification.

This invention relates to a bracket for supporting a rear view mirror on the wind shield of an automobile so that the driver is able to observe the road in rear of the car which he occupies and govern himself accordingly.

The purpose of this invention is to provide a bracket of this character which is very simple, inexpensive and compact in construction, which can be readily applied to all standard types of wind shields now in common use, which can be quickly adjusted into any desired angle, within certain limits, and then reliably held in position so that the same will not become displaced by the vibrations of the car, and which is so organized that some of the elements serve as part of the means for holding the mirror on the bracket and also to hold the mirror in its adjusted position with reference to the wind shield.

In the accompanying drawings:

Figure 1 is a perspective view of my improved bracket supporting a mirror viewed from the rear side of the same. Figure 2 is an end elevation thereof with parts of the hanger and the adjacent wind shield shown in section. Figure 3 is a top plan view of the bracket and the mirror supported thereon, with the hanger shown in section. Figure 4 is a vertical cross section, taken on line 4—4 of Figure 3. Figure 5 is a vertical longitudinal section taken on line 5—5 of Figure 4. Figure 6 is a similar section taken on line 6—6 of Figure 4.

Similar characters of reference indicate like parts throughout the several views.

The numeral 10 represents the upper horizontal bar of the wind shield frame which encloses and supports the transparent pane 11 of glass, which bar in the present instance serves as a support for my improved mirror bracket although other forms of support may be employed for this purpose if desired.

The mirror 12 in the present case is of rectangular oblong form with the major axis arranged horizontally and the minor axis vertically but this is merely illustrative of one form of mirror capable of being supported by the bracket containing my invention.

This bracket in the preferred form shown in the drawings is constructed as follows:

13 represents the body of the mirror bracket which, in the present case, is constructed as a plate and adapted to be arranged in rear of the mirror 12. At its opposite edges, for instance the upper and lower edges of this body plate, the same is provided adjacent to the corners thereof with forwardly projecting hooks 14 which are adapted to overhang the upper and lower edges of the mirror so that the latter is confined between these hooks and the body plate. On the central part of the body plate the same is provided with a rearwardly projecting hollow boss 15 which is preferably of rearwardly dished spherical form, this boss and the hooks 14 being preferably stamped with the body plate 13 out of a single sheet of metal, such as steel. Arranged in front of the body plate and in rear of the mirror is a bearing member or follower which, in the preferred construction, consists of a hollow spherical hub 16 which projects rearwardly into the hollow boss and a plurality of spring arms 17 arranged at the margin of this follower or bearing member and preferably arranged radially with reference to the hub 16. Upon pressing this follower forwardly its spring arms exert a yielding pressure against the rear side of the mirror and operate to hold the same firmly against the hooks 14 so that the mirror is firmly held against displacement on the bracket. In order to avoid marring the rear side of the mirror a protecting sheet 18 of paper, rubber or similar material is interposed between the front side of the follower or bearing member and the rear side of the mirror which operates to prevent the pressure of the follower from scratching or defacing the silvered rear surface of the mirror. Although various means may be employed for pressing the follower forwardly this is preferably accomplished by means of a clamping screw 19 working in a threaded opening in the central part of the boss 15 and engaging with the summit of the hub 16, which summit is preferably provided with a forwardly projecting indentation forming a concave seat 20 which receives the front end of the screw 19 and holds these parts in a centered position relatively to each other.

Between the body plate and the wind shield is arranged a hanger 21 which is preferably constructed of sheet metal and provided at its lower end with a concavo-convex head 22, the concave front side of which engages with the convex rear side of the boss 15 on the body plate. At its upper end this hanger is provided with a base 23 which is shaped to conform to the bar 10 of the wind shield and may be detachably secured thereto by means of bolts 24 or by other suitable and approved means. The head of the hanger is provided with a central opening 25 which is considerably larger in diameter than the shank of the screw 19 so that the boss 15 can turn in all directions with reference to this screw 19 and thus enable the mirror supported by the body plate to be adjusted at various angles with reference to the plane of the wind shield mirror 11. This construction therefore in effect produces a ball and socket joint between the body plate and the hanger, which permits the mirror to be adjusted in a vertical position, as shown by full lines in Figures 1, 2 and 4, and the same may also be tilted forwardly as shown by dotted lines in Figure 2, or the same may be tilted rearwardly, as shown by dotted lines in Figure 4. It also permits of turning the mirror on the hanger about a horizontal axis into the desired position, so that the mirror may occupy either a horizontal position, as shown by full lines in Figure 5, or the same may be tilted in a plane parallel with that of the wind shield, as indicated by dotted lines in the same figure. It will thus be evident that by means of this ball and socket joint between the body plate and the hanger a universal adjustment of the mirror relatively to the wind shield is possible. After the mirror has been adjusted into the proper position the same is firmly held in place by means which comprise a clamping disk 26 of concavo-convex form, which is preferably constructed of sheet metal and adapted to engage its concave front side with the convex rear side of the hanger head and held in engagement therewith by means of a collar or shoulder 27 formed on the clamping screw 19 and engaging with the rear side of this disk. This clamping screw may be turned in any suitable manner, for instance by providing its rear end with a finger piece or handle 28 which permits of manipulating this screw by hand for the purpose of causing its front end to bear against the hub of the follower and also to cause the boss of the body plate and the clamping disk to be drawn against opposite sides of the head of the hanger.

The several parts of this bracket are so proportioned that the first effect upon tightening the screw 19 is to press the follower toward the rear side of the mirror and hold the same firmly in place on the body plate while the clamping disk 26 is still sufficiently loose to permit of freely turning the body plate in all directions on the hanger for the purpose of adjusting the mirror into the right angular position which will give the driver the desired view toward the rear of the car. Thereafter upon further tightening the screw 19 its shoulder or collar 27 will bear against the rear side of the clamping disk 26 with sufficient force to cause the hanger head to be firmly gripped between the boss of the body plate and the clamping disk 26 to insure holding the mirror reliably in its adjusted position. During such additional tightening of the screw 19 for the purpose of clamping the body plate on the hanger the resilience of the metal of which the parts are constructed will permit the same to yield sufficiently to permit of this additional tightening of the screw 19 and merely press the follower toward the rear side of the mirror with somewhat greater pressure without however disturbing any of the parts. The clamping screw and associated parts therefore operate to perform the double function of not only clamping the mirror on the body or supporting plate, but also clamping the body or supporting plate on the hanger after these parts have been adjusted to the desired angularity relatively to each other.

The construction of this mirror bracket as a whole is therefore materially simplified and its cost reduced as well as rendering the structure more compact. The same can therefore not only be produced more economically but it is also more sightly in appearance and capable of being installed in cases where only a limited amount of room is available.

I claim as my invention:

1. A bracket for supporting a mirror on a wind shield comprising a body plate adapted to be arranged in rear of a mirror and provided at its opposite edges with forwardly projecting hooks adapted to overlap the edges of a mirror and provided on its central part with a rearwardly projecting hollow boss, a bearing member arranged in front of said body plate and having its central part dished rearwardly to form a hollow hub which is arranged in said hollow boss while its marginal part is adapted to be pressed forward toward the back of the mirror, and a clamping screw working in said boss and engaging with the rear side of said hub.

2. A bracket for supporting a mirror on a wind shield comprising a body plate adapted to be arranged in rear of a mirror and provided at its opposite edges with forwardly projecting hooks adapted to overlap the edges of a mirror and provided on its central part with a rearwardly projecting hollow boss, a bearing member arranged in front of said body plate and having its central part dished rearwardly to form a hollow hub which is arranged in said hollow boss while its marginal part is adapted to be pressed forward toward the back of the mirror, and a clamping screw working in said boss and engaging with the rear side of said hub, said hub being provided on its rear side with a central depressed seat which receives the front end of said screw.

3. A bracket for supporting a mirror on a wind shield comprising a body plate adapted to be arranged in rear of a mirror and provided at its opposite edges with forwardly projecting hooks adapted to overlap the edges of a mirror and provided on its central part with a rearwardly projecting hollow boss, a bearing member arranged in front of said body plate and having its central part dished rearwardly to form a hollow hub which is arranged in said hollow boss while its marginal part is constructed in the form of a plurality of radial spring arms adapted to be pressed forwardly toward the back of said mirror, and a clamping screw working in said boss and bearing against the rear side of said hub.

4. A bracket for supporting a mirror on a wind shield comprising a body plate, a bearing member arranged in front of said body plate and adapted to be pressed against the rear side of the mirror, a hanger having a head engaging with the rear side of said body plate, a disk engaging with the rear side of said head, and means for simultaneously pressing said bearing member toward said mirror and pressing said body plate and disk against opposite sides of said head.

5. A bracket for supporting a mirror on a wind shield comprising a body plate, a bearing member arranged in front of said body plate and adapted to be pressed against the rear side of the mirror, a hanger having a head engaging with the rear side of said body plate, a disk engaging with the rear side of said head, and means for simultaneously pressing said bearing member toward said mirror and pressing said body plate and disk against opposite sides of said head, consisting of a screw passing through said disk and head and working with its thread in said body plate and bearing at its front end against said bearing member and provided at its rear end with a shoulder engaging the rear side of said disk.

In testimony whereof I affix my signature.

WILLIAM LA HODNY.